United States Patent [19]
Saya

[11] Patent Number: 5,859,490
[45] Date of Patent: Jan. 12, 1999

[54] VIBRATION ACTUATOR AND DRIVING APPARATUS

[75] Inventor: Daisuke Saya, Chiba-ken, Japan

[73] Assignee: Nikon Corporation, Tokyo, Japan

[21] Appl. No.: 934,594

[22] Filed: Sep. 22, 1997

Related U.S. Application Data

[63] Continuation of Ser. No. 634,987, Apr. 19, 1996, abandoned.

[30] Foreign Application Priority Data

Apr. 19, 1995 [JP] Japan .................................... 7-093421
Apr. 5, 1996 [JP] Japan .................................... 8-083754

[51] Int. Cl.$^6$ .................................................. H01L 41/08
[52] U.S. Cl. ............................................................ 310/323
[58] Field of Search .................................... 310/323, 328

[56] References Cited

U.S. PATENT DOCUMENTS

| | | | |
|---|---|---|---|
| 5,101,132 | 3/1992 | Yamaguchi | 310/323 |
| 5,136,200 | 8/1992 | Takizawa et al. | 310/323 |
| 5,191,688 | 3/1993 | Takizawa et al. | 310/323 X |

FOREIGN PATENT DOCUMENTS 0081670  3/1989  Japan ...................................... 310/323

OTHER PUBLICATIONS

Y. Tomikawa et al., "Piezoelectric Linear Motors for Application to Driving a Light Pick–Up Element," Yamagata University, Yamagata, Japan.

*Primary Examiner*—Mark O. Budd
*Attorney, Agent, or Firm*—Oliff & Berridge, PLC

[57] ABSTRACT

A vibration actuator for use with a relative moving element includes a plate shaped elastic member. An electromechanical conversion element is attached to an upper surface of the elastic member. The electro-mechanical conversion element generates longitudinal and bending vibrations in the elastic member such that a side surface of the elastic member constitutes a neutral surface of the vibrations. A driving force output member is disposed at a bottom surface of the elastic member, and contacts the relative moving element. An extension member is disposed at the side surface of the extension member. A pressing force is applied by the extension member to the driving force output member to press the driving force output member toward the relative moving element.

14 Claims, 8 Drawing Sheets

VIBRATION ACTUATOR AND DRIVING APPARATUS

This is a continuation of application Ser. No. 08/634,987 filed Apr. 19, 1996 now abandoned.

BACKGROUND OF THE INVENTION

1. Field of the Invention

The present invention relates to a vibration actuator that effects a driving force by generating vibrations in an elastic member through an electro-mechanical conversion element.

2. Description of Related Art

Vibration actuators, such as ultrasonic actuators, are quiet, and have high torque, good control, and superior holding power. These actuators are classified generally as either linear or ring type. The ring type of actuators are used in AF motors of various mechanical devices, such as cameras.

FIG. 7 is an elevational view showing a conventional linear type ultrasonic actuator. A transformer 102, for use in excitation, is disposed at one end of a bar-shaped elastic member 101. Another transformer 103, for use in controlling vibrations, is disposed at the other end of the elastic member 101. Vibration elements 102*a* and 103*a* are connected to transformers 102 and 103, respectively. Alternating current is impressed from the oscillator 102*b* to the vibration element 102*a* used in excitation, which causes the bar-shaped elastic member 101 to vibrate. This vibration propagates across the bar-shaped elastic member 101 and becomes a progressive wave. The progressive wave drives a relative moving element 104 that is in pressure contact with the bar-shaped elastic member 101.

The vibration of the bar-shaped elastic member 101 is conveyed to the vibration element 103*a* via the vibration control transformer 103. The vibration energy is converted to electrical energy through the vibration element 103*a*. The vibrations are absorbed by the electrical energy consumed by a load 103*b* that is connected to the vibration element 103*a*. The reverberation of the end surface of the bar-shaped elastic member 101 is suppressed by the vibration control transformer 103. The transformer 103 thus prevents the generation of standing waves of the mode unique to the bar-shaped elastic member 101.

The length of the bar-shaped elastic member 101 must be within the moving range of the moving element 104 for the conventional linear type ultrasonic actuator of FIG. 7. Also, it is necessary to excite the entire bar-shaped elastic member 101. Consequently, conventional linear type ultrasonic actuators tend to be large in size. Additionally, a transformer 103 must be included for vibration control in order to prevent the generation of standing waves of unique mode.

In order to resolve the above and other problems, various self-advancing vibration actuators have been proposed, such as "longitudinal L1-bending B4 mode flat-plate motor," disclosed at pages 393–398, "222 piezoelectric linear motor for the purpose of optical pickup," that was included in "Lectures from the Fifth Electromagnetic Power-Related Dynamic Symposium." FIGS. 8A, 8B and 8C show different views of a "longitudinal L1-bending B4 mode flat-plate motor." FIG. 8A is a front view, FIG. 8B is a side view and FIG. 8C is a top view.

The elastic member 1 includes a base unit 1*a* that is formed into a flat, rectangular plate, and two driving force output members 1*b* and 1*c*. Members 1*b* and 1*c* project from one surface of the base unit 1*a*. Piezoelectric members 2 and 3 are bonded to another opposing surface of the base unit 1*a*. Piezoelectric members 2 and 3 include units that are excited by a driving voltage that is impressed thereon. The driving voltage generates the longitudinal vibration L1 mode and the bending vibration B4 mode in the elastic member 1.

The driving force output members 1*b* and 1*c* are disposed in an area that is the antinode of the bending vibration B4 mode in the elastic member. Output members 1*b* and 1*c* are pressed onto a relative moving element (not shown), such as a rail.

The ultrasonic actuator shown in FIGS. 8A, 8B and 8C is constructed so that the unique vibration frequencies of the longitudinal vibration L1 mode and the bending vibration B4 mode of the elastic member 1 are extremely close together. The two vibration modes are harmonized by alternating current having frequencies that are close to the two unique vibration frequencies impressed on the piezoelectric members 2 and 3. Elliptical motion is thus generated in the elastic member 1. The elliptical motion is output as thrust via the driving force output members 1*b* and 1*c*.

FIG. 9 is a conventional pressing mechanism for pressing an elastic member 1 toward a relative moving element 4, consistent with an ultrasonic actuator co-invented by Yoshiro Tomikawa and Sadayuki Ueha. The center of the elastic member 1, between the driving force output members 1*b* and 1*c*, is pressed toward the relative moving member 4 by the pressing mechanism 7. The pressing mechanism 7 includes a coil spring 6 and a pressing plate 5. The pressing plate 5 operates as a shock-absorber and is formed of felt.

The pressing mechanism 7 of FIG. 9 is constructed to press the center of the elastic member 1, between the driving force output members 1*b* and 1*c*, because that position is a common node for longitudinal and bending vibrations. Pressing the elastic member at the common node minimizes the resultant obstruction of the vibrations. The pressing mechanism 7, thus, minimizes the reduction in driving efficiency caused by pressing the elastic member 1.

However, the pressing plate 5 shown in FIG. 9 contacts the elastic member 1 through the piezoelectric members 2 and 3. This construction causes the vibrations of the elastic member 1 to be absorbed during pressing, which reduces driving efficiency.

Additionally, pressing the center of the elastic member 1 between the driving force output members 1*b* and 1*c* with the pressing mechanism 7 bends the elastic member 1, as shown in FIG. 10. The center of the elastic member 1 is at the apex of the bow. Small gaps are defined at the surfaces of contact between the driving force output members 1*b* and 1*c* and the relative moving element 4.

The driving force of the vibration actuators shown in FIGS. 8 and 9 is proportional to the product, F×$\mu$, wherein F is the pressing force on the elastic member 1 and $\mu$ is the coefficient of dynamic friction between the driving force output members 1*b* and 1*c* and the relative moving element 4. Consequently, the pressing force F must be increased in order to increase the driving force of the vibration actuator. However, the elastic member 1 bends more, and the gaps between the driving force output members 1*b* and 1*c* and the relative moving element 4 increase, when the pressing force F increases. The increased gaps result in a reduction in the area of contact between the driving force output members 1*b* and 1*c* and the relative moving element 4. Thus, the sliding relationship between the elastic member 1 and the relative moving element 4 becomes unstable, and tends to shift the position of contact between these elements. This shifting of position causes problems, such as speed irregularities, and a shortening of the life of the vibration actuator based upon uneven wear on the bottom surfaces of the driving force output members 1b and 1c.

Furthermore, the pressing plate 5 of FIG. 9 includes a textile material, such as felt, to prevent short circuits. The inclusion of the textile material diminishes the weather-resistance of the apparatus. The pressing force of the pressing plate 5 also changes as it gets older, which reduces the reliability of the vibration actuator.

SUMMARY OF THE INVENTION

It is, therefore, an object of the present invention to provide a vibration actuator that can minimize the reduction in driving efficiency caused by pressing an elastic member of the vibration actuator.

It is also an object of the present invention to provide a vibration actuator that is not subject to a reduction in durability when the pressing force that presses the elastic member toward the relative moving element is increased for the purpose of increasing the driving force of the vibration actuator.

It is another object of the present invention to provide a vibration actuator that is reliable, weather-resistant and subject to a minimal decrease in performance due to aging.

Furthermore, it is yet another object of the present invention to provide a driving apparatus that includes the above described vibration actuator.

If increasing the pressing force is the only factor taken into consideration, it is preferable to provide a pressing member along the entire side surface of the elastic member. However, this structure hinders the generation of vibrations, and thus prevents the attainment of an appropriate driving force. The present invention increases the driving force without hindering vibrations by focussing on the bending vibrations that are the source of the driving power. The invention provides an extension member at a position that does not obstruct the bending vibrations.

Specifically, the present invention provides a vibration actuator that includes a plate shaped elastic member. An electro-mechanical conversion element is joined to a first plane surface of the elastic member. The electro-mechanical conversion element generates longitudinal and bending vibrations. A driving force output member is provided on a second plane surface of the elastic member. An extension member is provided at the elastic member, on or near a neutral surface of the bending vibrations, preferably, the extension member is provided at a side surface of the elastic member. The extension member is used to apply pressure on the driving force output member to press the driving force output member toward the relative moving element.

Additionally, the extension member can be disposed symmetrically with a lengthwise direction of the elastic member.

The elastic member can include two driving force output members. The extension member can be disposed between the two driving force output members.

A pressing unit can be provided on an edge of the extension member. The pressing unit can extend in a vibration direction of the bending vibrations.

Preferably, the thickness of the extension member in the vibration direction of the bending vibrations is not greater than ½ of the plate thickness of the elastic member.

The elastic member can generate bending vibrations that have plural nodes. The extension member can be disposed between the nodes with respect to the lengthwise direction of the elastic member.

The present invention also includes a driving apparatus that incorporates the above described vibration actuator. A relative moving element contacts a driven member and the vibration actuator via the driving force output member. A pressing force adjusting mechanism presses the vibration actuator toward the relative moving element via the extension member.

The vibration actuator in accordance with the present invention uses an extension member to press the driving force output members toward the relative moving element. The extension member is provided at a position on the elastic member which is on or near a neutral surface of the bending vibrations created in the elastic member. This construction minimizes the obstruction of the bending vibrations caused by the extension member. Additionally, because the extension member is provided on the side surface of the elastic member, the pressing force acts on the elastic member at the location where the extension member is positioned. The extension member thus minimizes the bending of the elastic member caused by the pressing force. Furthermore, it is not necessary to prevent short circuits of the piezoelectric member since the extension member is provided on the side surface of the elastic member. Consequently, the extension member can be constructed from a variety of materials, such as the same material as the elastic member. The extension member can thus be constructed of a material which is weather-resistant and subject to a minimal decrease in performance due to aging.

Obstructions to the longitudinal vibrations created in the elastic member are reduced by providing two driving force output members on the elastic member, and positioning an extension member, that is spaced from the ends of the elastic member, between the extension members.

It is easier to install the vibration actuator into the driving apparatus when a pressing unit is provided on the edge of the extension member and that extends in the vibration direction of the bending vibrations. This construction also improves the strength of the extension member.

The vibration actuator in accordance with the invention can also include an extension member having a depth in the vibration direction of the bending vibrations that is not greater than ½ of the plate thickness of the elastic member. This construction prevents the bending vibrations from being obstructed, is easy to manufacture, and makes it easy to accurately press the elastic member.

Obstructions to the longitudinal vibrations created in the elastic member are reduced when the bending vibrations created in the elastic member have plural nodes and the extension member is positioned such that it is spaced from the ends of the elastic member and is disposed between the nodes in the lengthwise direction of the elastic member.

DETAILED DESCRIPTION OF PREFERRED EMBODIMENTS

Figure 1:
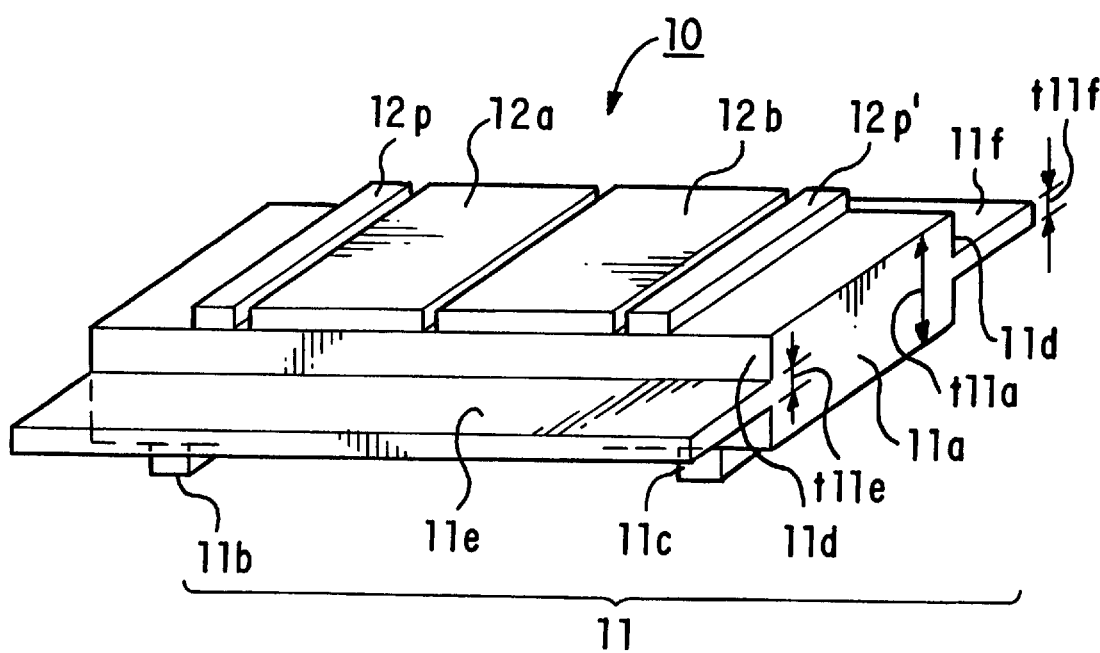
FIG. 1 is a perspective view showing a vibration actuator according to an embodiment of the present invention.

FIG. 1 is a perspective view showing a vibration actuator according to an embodiment of the present invention. The vibration actuator 10 includes an elastic member 11 that includes a plate shaped base unit 11a, and driving force output members 11b and 11c. Four piezoelectric members 12a, 12b, 12p and 12p' are joined to a first plane surface of the elastic member base unit 11a.

The elastic member base unit 11a has a plate thickness $t_{11a}$. The elastic member base unit 11a is preferably constructed of metal. However, the base unit 11a can also be constructed of an elastic material, such as plastic. The driving force output members 11b and 11c are disposed at the antinodes, i.e., areas of maximum vibration amplitude, of the bending vibration that is generated in the elastic member 11 during driving.

The piezoelectric member 12 is an electro-mechanical conversion element that converts electric signals into mechanical displacement. The piezoelectric member 12 includes piezoelectric elements 12a and 12b, and vibration monitoring piezoelectric elements 12p and 12p'. Each of the piezoelectric elements 12a, 12b, 12p and 12p' is attached to a plane surface of the elastic member base unit 11a. This attachment may be achieved by various techniques, such as welding.

A rubbing material (not shown) can be attached to bottom surfaces of the driving force output members 11b and 11c in order to suppress rubbing resistance between the driving force output members 11b and 11c and a relative moving element (not shown).

Alternating current voltages having perpendicular phases, e.g., the orientation of the phases being separated by 90°, are impressed on the driving piezoelectric elements 12a and 12b. Applying the alternating current generates longitudinal vibrations, i.e., first degree longitudinal vibrations in the L1 mode, and bending vibrations, i.e., fourth degree longitudinal vibrations in the B4 mode, in the elastic member 11. The two vibrations generate elliptical motion in the driving force output members 11b and 11c. The elliptical motion of the driving force output members 11b and 11c produces a driving force.

The vibration monitoring piezoelectric members 12p and 12p' are mechanical-electro converting elements which convert mechanical displacement into electrical signals. Members 12P and 12P' monitor the vibrations created in the elastic member 11, and output this data to a control circuit 25 shown in FIG. 2.

Generally, the elastic member 11 is connected to an electric ground potential (not shown). A common electrode can be connected by soldering lead wires to the elastic member 11, or adhering metal foil to the elastic member 11 and attaching the lead wires to the metal foil.

Extension members press the driving force output members 11b and 11c toward the relative moving element. The extension members are positioned on two side surfaces 11d of the elastic member base unit 11a, at the neutral plane of the bending vibrations created in the elastic member 11. However, if the extension members are spaced from the neutral plane, an elongation or compression stress acts on the elastic member base unit 11 and vibrations are suppressed during pressing. These problems do not arise when the extension members are disposed on or near the neutral plane of the elastic member.

The extension members include a metal plate 11e having a plate thickness $t_{11e}$, and a metal plate 11f having a plate thickness $t_{11f}$. The metal plates 11e and 11f are fixed to the elastic member base unit 11a by various techniques, such as welding.

The plate thicknesses $t_{11e}$ and $t_{11f}$ of the plates 11e and 11f are preferably as thin as possible so as to not obstruct the bending vibrations created in the elastic member. However, if the plate thickness $t_{11e}$ and $t_{11f}$ are too thin, manufacturing becomes difficult and the members deform under the pressing force. Accordingly, the plate thicknesses $t_{11e}$ and $t_{11f}$ of the plates 11e and 11f are preferably not greater than ½ of the plate thickness $t_{11a}$ of the elastic member base unit 11a.

Additionally, the plates 11e and 11f and the elastic member 11 vibrate together when the characteristic vibration frequency of the plates 11e and 11f and the bending vibrations created in the elastic member 11 substantially coincide. The response is delayed when the plates 11e and 11f vibrate together. Accordingly, the characteristic vibration frequency of the plates 11e and 11f should be set to at least 1.2 times, and preferably at least 1.4 times, the characteristic vibration frequency of the bending vibrations of the elastic member 11. This construction prevents the vibrations in the elastic member 11 from being severely suppressed by the pressing force, and enhances the driving performance by improving responsiveness.

A large amount of energy is consumed when the characteristic vibration frequency of the plates 11e and 11f exceeds four times the characteristic vibration frequency of the bending vibrations. The driving efficiency is also decreased. Therefore, the characteristic vibration frequency of the plates 11e and 11f is preferably not greater than 4 times the characteristic vibration frequency of the bending vibrations created in the elastic member 11.

The plates 11e and 11f are disposed at the side surfaces 11d of the elastic member, near the neutral plane of the bending vibrations. The plates do not obstruct the bending vibrations created in the elastic member when the elastic member 11 is pressed by virtue of their position near the neutral plane of the bending vibrations. Also, the amplitude of the longitudinal vibrations is not suppressed by virtue of the position of the plates 11e and 11f at the side surfaces 11d, i.e., where the longitudinal vibrations have no amplitude.

The plates 11e and 11f are positioned along the entire length of the side surfaces of the elastic member base unit 11a. The pressing force applied to the plates 11e and 11f is uniformly applied over the entire length of the elastic member base unit 11a. Consequently, the amount of bending of the elastic member base unit 11a due to pressing is reduced compared to conventional models. This construction increases durability and decreases speed irregularities, even when the pressing force is increased to increase the driving force. The vibration actuator 10 in accordance with the invention attains a longer life span than conventional models.

The plates 11e and 11f are positioned on the side surfaces 11d of the elastic member 11, and thus do not contact the piezoelectric elements 12a and 12b. Consequently, the plates 11e and 11f can be manufactured from the same material as the elastic member 11a. The use of textile material such as felt is thus obviated, which improves weather-resistance. This construction minimizes deterioration due to aging, and thus improves the reliability of the vibration actuator 10.

Figure 2:
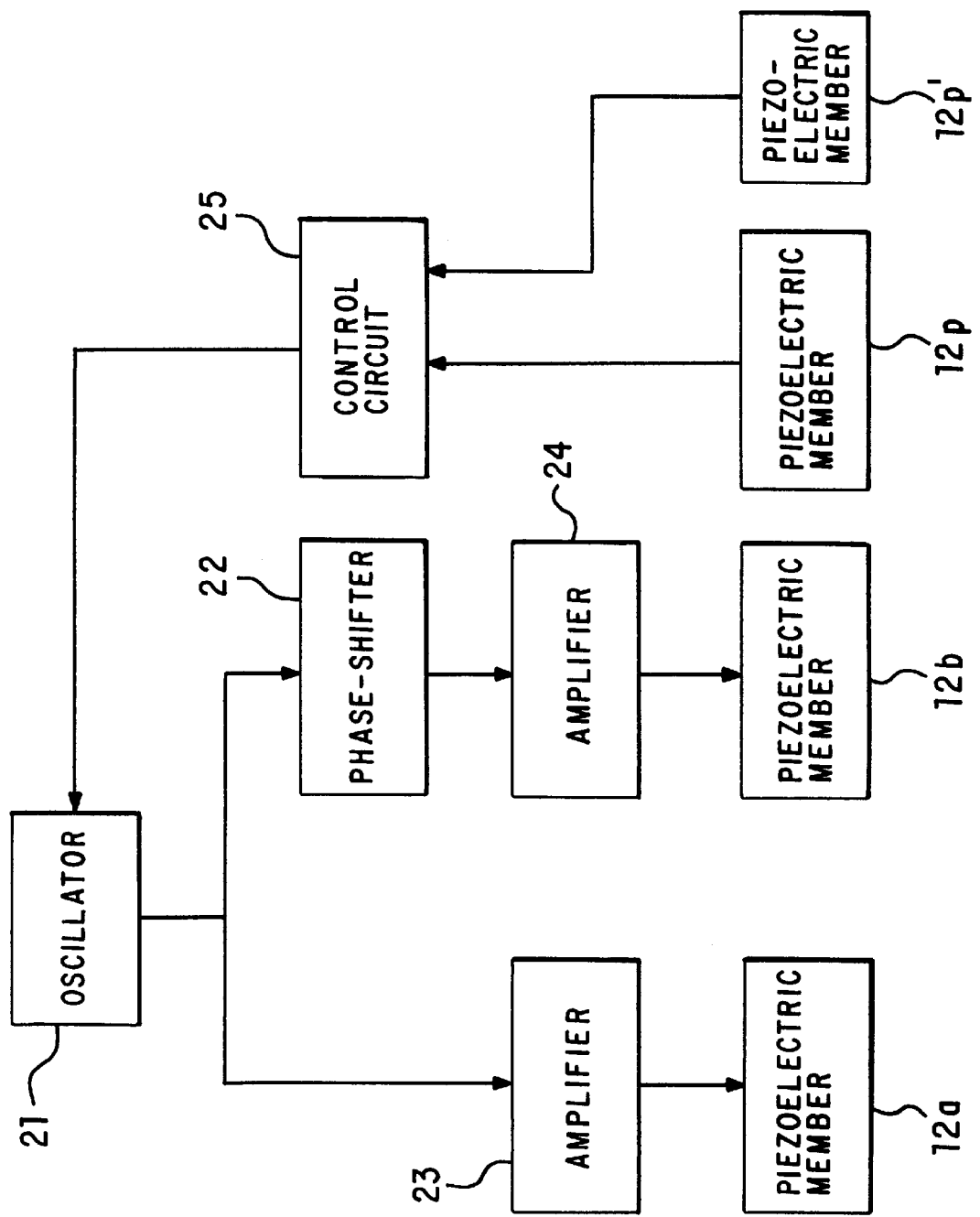
FIG. 2 is a block diagram showing a driving circuit of the vibration actuator of FIG. 1.

FIG. 2 is a block diagram showing a driving circuit of the vibration actuator 10 of FIG. 1. The oscillator 21 emits a signal of a frequency that generates vibrations. The vibrations are a combination of first degree longitudinal vibrations and fourth degree bending vibrations. The vibrations are generated in a vibrating body. The vibrating body includes the elastic member 11 and the piezoelectric member 12. The output of the oscillator 21 is divided. A portion of the output is amplified by an amplifier 23 and subsequently input into an electrode of a driving piezoelectric member 12a as A-phase voltage. The other part of the divided signal is connected to a phase-shifter 22. The phase-shifter 22 shifts the phase of A-phase voltage by $\pi/2$ to make B-phase voltage. This voltage is subsequently input into an electrode 12b of the driving piezoelectric member 12b via an amplifier 24.

The output voltages of the vibration monitor piezoelectric members 12p and 12p' are input into a control circuit 25. The control circuit 25 compares the above described output voltages and a predetermined standard voltage. The control circuit 25 controls the oscillator 21 to lower the frequency when the output of the p and p' terminals is less than the predetermined standard voltage. The frequency is raised when the output of the p and p' terminals is larger than the predetermined standard voltage. The vibration amplitude of the vibration actuator is thus maintained at a predetermined level.

FIGS. 3A–3D are schematics showing the action of the vibration actuator of FIG. 1. The vibration actuator 10 generates vibrations that are a combination of bending vibrations and longitudinal vibrations by impressing alternating current voltages having perpendicular phases, e.g., the orientation of the phases being separated by 90° on the driving piezoelectric members 12a and 12b. Applying the alternating current generates elliptical motion at the tip of the driving force output members 21b and 21c of the elastic member 11. The elastic member 11 is pressed by a pressing apparatus (not shown) from the plates 11e and 11f that are fixed to the side surfaces of the elastic member. The driving force output members 21b and 21c contact a relative moving element (not shown) to produce a driving force.

The driving piezoelectric members 12a and 12b are polarized in the same direction. The high frequency voltages, e.g., alternating voltages A and B, can have a time phase difference of $\pi/2$. However, the polarity of the driving piezoelectric members 12a and 12b can also be in mutually opposite directions.

Figure 3:
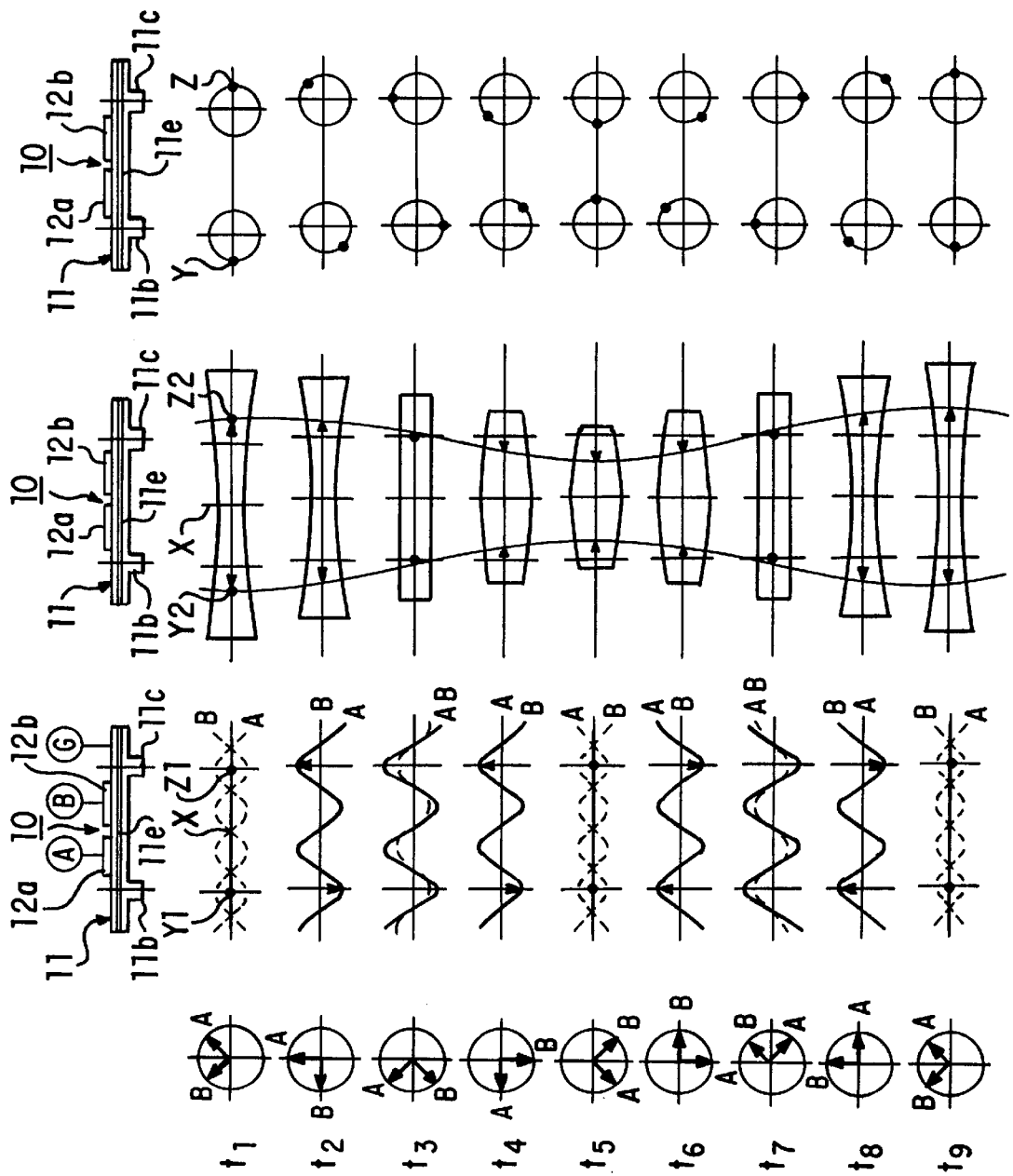
FIGS. 3A–3D are schematics showing the action of the vibration actuator of FIG. 1.

FIG. 3A shows, as $t_1$ through $t_9$, the time change in high frequency alternating current voltages A and B that are input into the vibration actuator 10. The horizontal axis shows the effective value of the high frequency voltages for each time period. FIG. 3B shows the condition of the deformation of the cross-section of the vibration actuator 10, as well as the time change, $t_1$ through $t_9$, of the bending vibration created in the vibration actuator 10. FIG. 3C shows the condition of the deformation of the cross-section of the vibration actuator 10, and shows the time change, $t_1$ through $t_9$, of the longitudinal vibration created in the vibration actuator 10. FIG. 3D shows the time change, $t_1$ through $t_9$, of the elliptical motion created in the driving force output members 21b and 21c of the vibration actuator 10.

At time $t_1$, the high frequency voltages A and B create positive voltages, as shown in FIG. 3A. The bending vibrations caused by the high frequency voltages A and B cancel each other out, and material points Y1 and Z1 have amplitudes of 0, as shown in FIG. 3B. The longitudinal vibrations caused by high frequency voltages A and B are generated in the direction of elongation of the vibration actuator 10, as shown in FIG. 3C. Material points Y2 and Z2 indicate maximum elongation centered about node X, as indicated by the arrows. As a result, the bending and horizontal vibrations are combined. The combination of the motion of material point Y1 and material point Y2 results in the motion of material point Y, as shown in FIG. 4D. The combination of the motion of material point Z1 and material point Z2 results in the motion of material point Z, as shown in FIG. 3D.

At time $t_2$, high frequency voltage B is 0, and high frequency voltage A creates a positive voltage, as shown in FIG. 3A. A bending vibration is generated by high frequency voltage A. Material point Y1 is amplified in the negative direction, and material point Z1 is amplified in the positive direction, as shown in FIG. 3B. A longitudinal vibration is generated by high frequency voltage A. Material point Y2 and material point Z2 contract from time $t_1$, as shown in FIG. 3C. As a result, the bending and horizontal vibrations are combined. Material point Y and the material point Z shift counterclockwise from their respective positions of time $t_1$, as shown in FIG. 3D.

At time $t_3$, high frequency voltage A creates a positive voltage, and high frequency voltage B creates an equal negative voltage, as shown in FIG. 3A. The bending vibration caused by high frequency voltages A and B are combined and amplified. Material point Y1 is amplified in the negative direction further than at time $t_2$, indicating a maximum negative amplitude, as shown in FIG. 3B. The material point Z1 is amplified in the positive direction further than at time $t_2$, indicating a maximum positive amplitude. The longitudinal vibrations caused by high frequency voltages A and B cancel each other out. Material points Y2 and Z2 return to their original positions, as shown in FIG. 3C. As a result, the bending and horizontal vibrations are combined. Material point Y and the material point Z shift counterclockwise from their respective positions of time $t_2$, as shown in FIG. 3D.

At time $t_4$, high frequency voltage A is 0, and high frequency voltage B creates a negative voltage, as shown in FIG. 3A. A bending vibration is generated by high frequency voltage B. The amplitude of material points Y1 and Z1 both decrease from that of time $t_3$, as shown in FIG. 3B. A longitudinal vibration is generated by high frequency voltage B. Material point Y2 and material point Z2 contract, as shown in FIG. 3C. As a result, the bending and horizontal vibrations are combined. Material point Y and material point Z shift counterclockwise from their positions at time $t_3$, as shown in FIG. 3D.

At time $t_5$, the high frequency voltages A and B both create a negative voltage, as shown in FIG. 3A. The bending vibrations caused by high frequency voltages A and B cancel each other out. Material point Y1 and material point Z1 both have amplitudes of 0, as shown in FIG. 3B. Longitudinal vibrations are generated by high frequency voltages A and B in the direction of contraction, as shown in FIG. 3C. Material point Y2 and material point Z2 indicate maximum contraction centered about node X, as indicated by the arrows. As a result, the bending and horizontal vibrations are combined. Material point Y and material point Z shift counterclockwise from their positions at time $t_4$, as shown in FIG. 3D.

This pattern of bending and horizontal vibrations continues for times $t_6$ though $t_9$. Material point Y and material point Z both continue to shift counterclockwise and have elliptical motions, as shown in FIG. 3D.

The vibration actuator 10 in accordance with the present invention generates elliptical motion at the tips of the driving force output members 21b and 21c. The elliptical motion creates an output force. Accordingly, relative motion is created between the elastic member 11 and the relative moving element when the tips of the driving force output members 21b and 21c press against the relative moving element.

By impressing alternating voltages that have different phases on the piezoelectric elements 12a and 12b, longitudinal and bending vibrations are generated in the elastic member 11. The horizontal and bending vibrations become motion components in the driving direction and motion components perpendicular to the driving direction, which produces elliptical motion.

Figure 4:
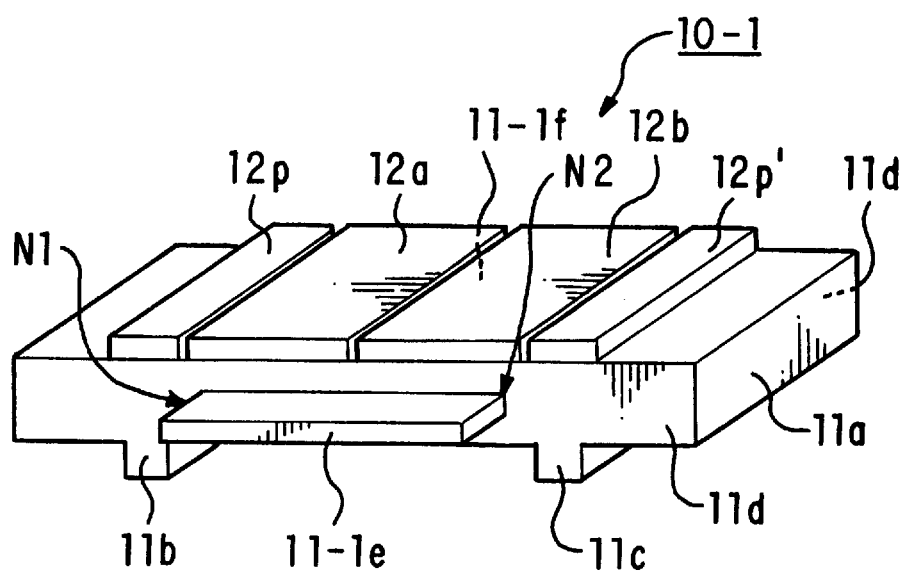
FIG. 4 is a perspective view showing a vibration actuator according to another embodiment of the present invention.

FIG. 4 is a perspective view showing a vibration actuator of another embodiment of the present invention. In each of the following embodiments, components having the same function as in the first embodiment are labelled with the same symbols, and redundant explanation of these components is omitted.

The vibration actuator 10-1 is similar to the vibration actuator 10 of the first embodiment. However, the plates 11-1e and 11-1f are not positioned along the entire length of the side surfaces 11d of the elastic member 11a. Instead, the plates 11-1e and 11-1f are provided between the nodes of the bending vibrations on the side surfaces 11d. The plates 11-1e and 11-1f are provided between points N1 and N2, as shown in FIG. 4.

Obstructions to the longitudinal vibrations created in the elastic member 11 are suppressed by positioning the plates 11-1e and 11-1f between points N1 and N2. This construction provides for increased elliptical motion in the driving force output members 11b and 11c, and improves driving efficiency.

Figure 5:
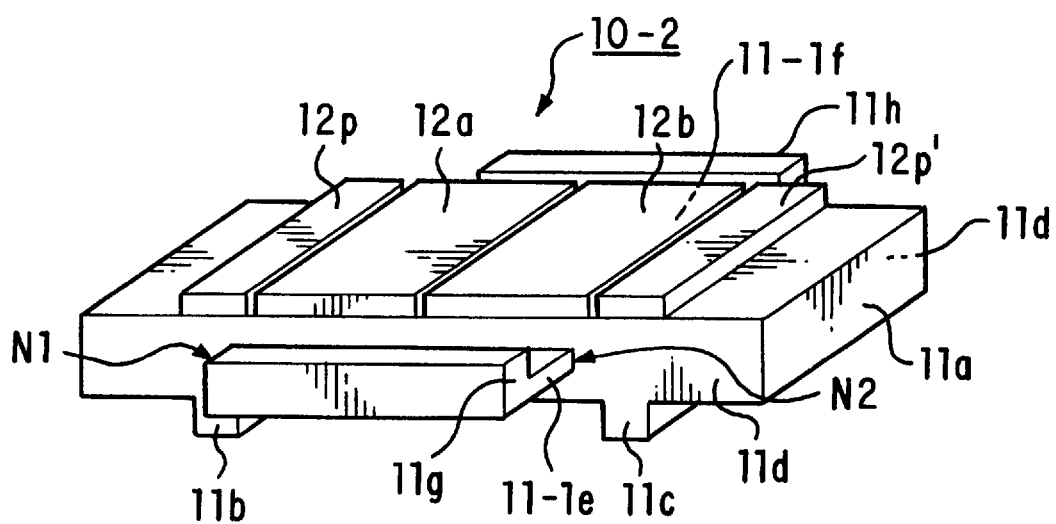
FIG. 5 is a perspective view showing a vibration actuator according to yet another embodiment of the present invention.

FIG. 5 is a perspective view showing a vibration actuator according to yet another embodiment of the present invention. The vibration actuator 10-2 is similar to vibration actuator 10-1. However, flange-shaped pressing parts 11g and 11h extend in the vibration is direction of the bending vibrations generated in the elastic member, i.e., vertically. The pressing parts 11g and 11h are disposed on the edges of the outside of the plates 11-1e and 11-1f, respectively, in the widthwise direction.

The pressing parts 11g and 11h can be formed integrally with the plates 11-1e and 11-1f. However, the pressing parts 11g and 11h can also be attached to the plates 11-1e and 11-1f by various techniques, such as welding. The pressing parts 11g and 11h increase the strength of the plates 11-1e and 11-1f, which minimizes the deformation of the plates 11-1e and 11-1f resulting from the pressing force.

The inclusion of the pressing parts 11g and 11h on the plates 11-1e and 11-1f makes it easier to incorporate the actuator 10-2 into another apparatus, such as a driving apparatus.

Figure 6:
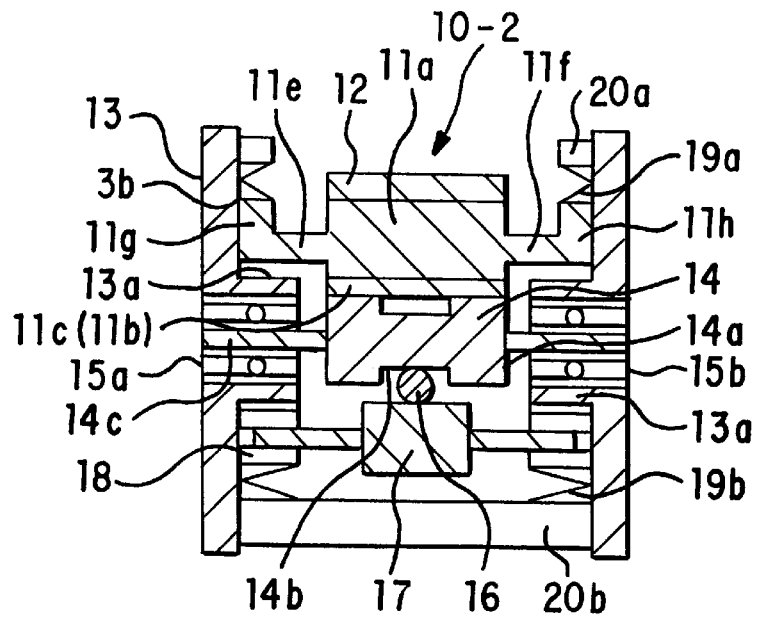
FIG. 6 is a side view showing a driving apparatus that includes the vibration actuator of FIG. 5.
Figure 7:
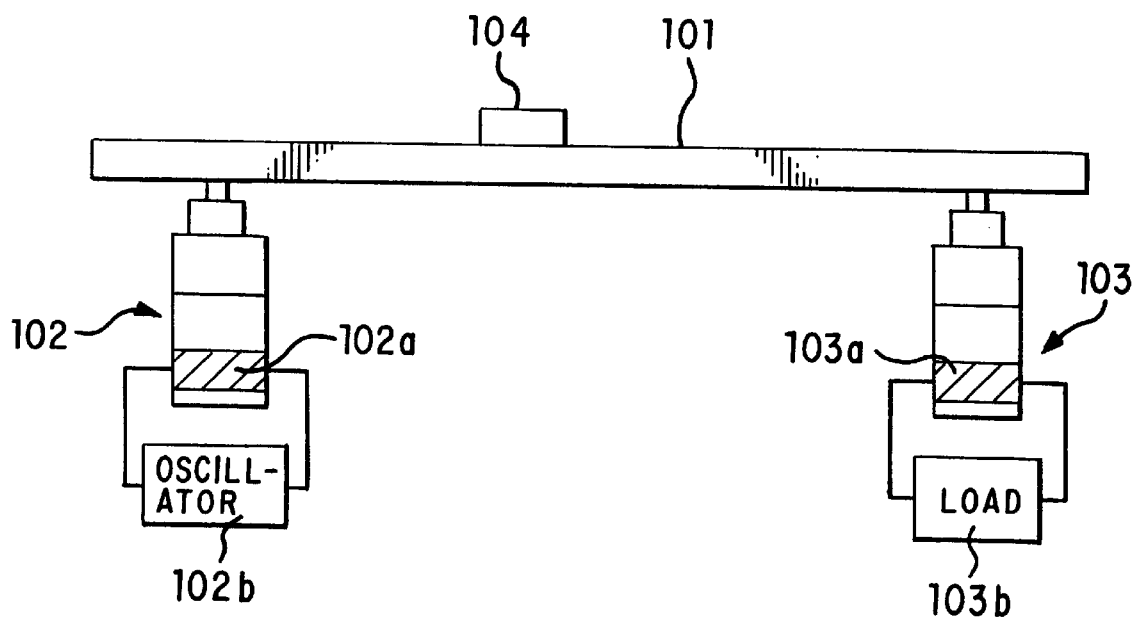
FIG. 7 is a front view showing a conventional linear-type vibration actuator.
Figure 8B:
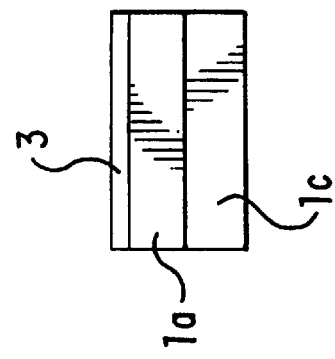
FIGS. 8A–8C are front, side and top views showing a conventional longitudinal L1-bending B4 mode flat-plate motor.
Figure 8C:
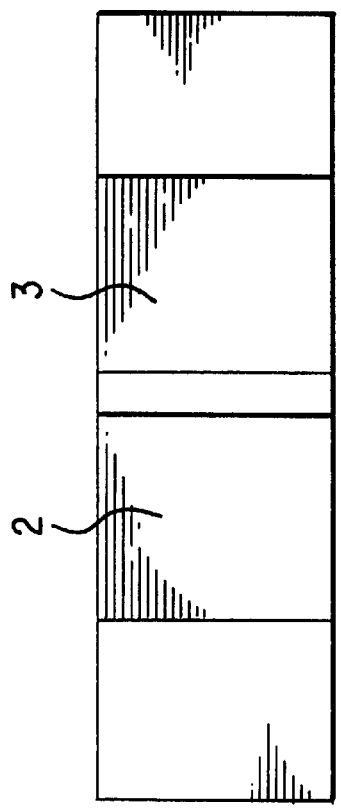
Figure 8A:
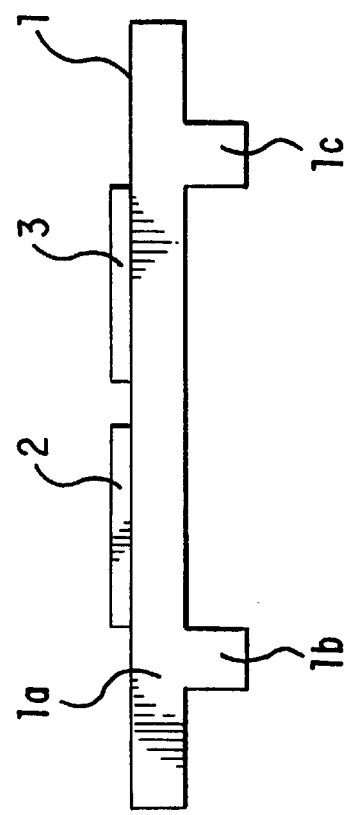
Figure 9:
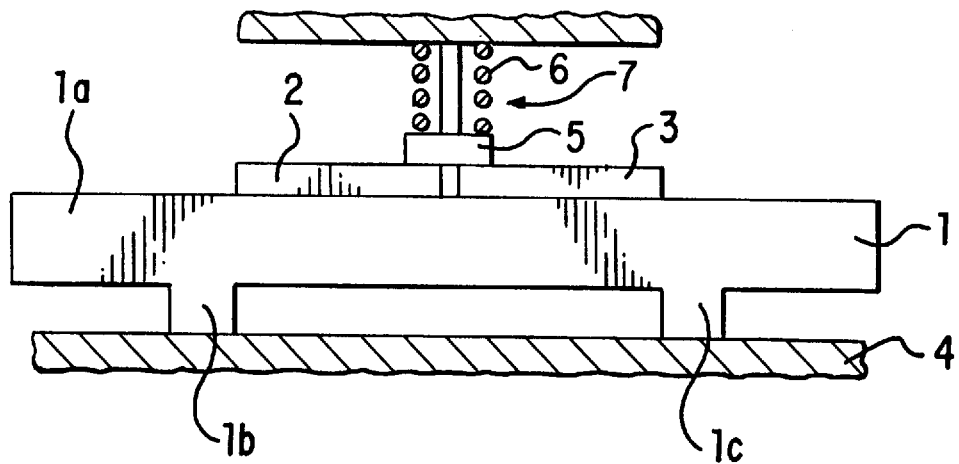
FIG. 9 is a side view showing a conventional mechanism that presses an elastic member toward a relative moving element.
Figure 10:
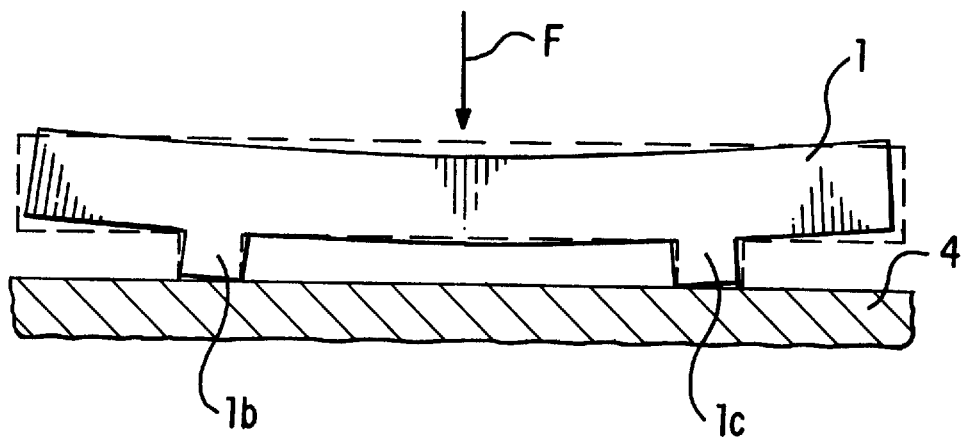
FIG. 10 is a side view showing an elastic member that is bent by a pressing force.

FIG. 6 is a side view showing a driving apparatus that includes the vibration actuator of FIG. 5. The case 13 has a rectangular cross-section and extensions 13a in the center of an interior surface. The vibration actuator 10-2 is disposed inside the case 13. The pressing parts 11g and 11h of the vibration actuator 10-2 are pressed toward the extensions 13a by a pressing member, i.e., a spring 19a, and by a pressing force adjusting member 20a and 20b. The pressing force adjusting member 20a and 20b is placed on an interior surface of the case 13. A component 20a of the pressing force adjusting member 20a adjusts the pressing force of the pressing member 19b.

The driving force output members 11b and 11c of the vibration actuator 10-2 contacts a large diameter part 14b of the relative moving element 14 under pressure. The large diameter part 14b is a rotating body that has an H-shaped cross section. The relative moving element 14 is fixed to a rotation shaft 14c. The rotation shaft 14c is incorporated into an extension unit 13a of the case 12. The rotation shaft is rotatably supported by bearings 15a and 15b. The relative moving element 14 rotates, with the rotation shaft 14c as the center of rotation, when the vibration actuator 10-2 is driven. The relative moving element 14 includes a groove-shaped, small diameter part 14b. A bar-shaped driven member 16 contacts the small diameter part 14b.

A roller holding member 18 holds a roller 17. A pressing force adjustment member 20b adjusts the pressing force of a pressing member 19b. The holding member 18 and the adjustment member 20b are both fixed to an interior surface of the case 13. The roller 17 is pressed toward the driven member 16 by the pressing force adjusting member 20b and the pressing member 19b. The driven member 16 is thus interposed between the roller 17 and the relative moving element 14.

The relative moving element 14 rotates when the vibration actuator 10-2 is started. This rotation causes the driven member 16, which is energized toward the relative moving element 14 by the roller 17, to be driven in a direction perpendicular to the plane of FIG. 6.

The present invention is not limited to the above-described embodiments, for various alterations and variations are possible, and these are also included in the present invention.

For example, the vibration actuator does not have to utilize the combination of longitudinal and bending vibrations. For example, the vibration actuator can be driven by some other principle, such as a L1-B2 format, i.e., a combination of first degree longitudinal vibrations.

A piezoelectric member does not have to be used as the electro-mechanical converting element. For example, an electrostriction or magnetostriction member can also be used.

The extension members 11e and 11f do not have to be located at positions on the neutral plane of the bending vibrations created in the elastic member 11. For example, the extension members 11e and 11f can be disposed in the vicinity of the neutral plane, as long as the vibrations are not obstructed.

Plates do not have to be used as the extension members. For example, the extension members can have any shape, as long as it does not suppress the vibrations of the elastic member and can accurately press the elastic member.

The driving force output members 11b and 11c do not have to be formed on the elastic member 11 as protrusions. Even if the elastic member 11 is a flat plate, the antinode, i.e., the area of maximum vibration amplitude, of the bending vibration created during driving, still functions as a driving force output member. Consequently, the vibration actuator can be constructed such that the position of the antinode of the bending vibration is pressed against the relative moving element with a predetermined pressing force.

The vibrations created in the elastic member do not have to be in the ultrasonic range. Any range of vibrations can be used that are capable of providing the necessary driving force.

What is claimed is:

1. A vibration actuator for use with a relative moving element, comprising:

an elastic member of rectangular parallelepiped form having upper, lower and side surfaces;

an electro-mechanical conversion element attached to the upper surface of the elastic member that generates longitudinal and bending vibrations in the elastic member such that the side surface of the elastic member constitutes a neutral surface of the bending vibration;

a driving force output portion at the lower surface of the elastic member, the driving force output portion contacting the relative moving element; and an extension member attached to the side surface of the elastic member directly and has a thickness that is thinner than the thickness of the elastic member and which is disposed at or near the neutral surface of the bending vibration and extends along a long side direction of the side surface, whereby a pressing force is applied by the extension member to the driving force output portion to press the driving force output portion toward the relative moving element.

2. A vibration actuator according to claim 1, wherein the extension member is disposed symmetrically with respect to the long side direction of the elastic member.

3. A vibration actuator according to claim 1, wherein the driving force output portion includes two driving force output portions, and the extension member is disposed between the two driving force output portions.

4. A vibration actuator according to claim 1, further comprising a pressing unit disposed at an edge of the extension member and extending in a vibration direction of the bending vibrations.

5. A vibration actuator according to claim 3, wherein the extension member has a thickness that is not greater than ½ of a thickness of the elastic member.

6. A vibration actuator according to claim 1, wherein the extension member has a characteristic vibration frequency that is at least 1.2 times greater than a characteristic vibration frequency of the bending vibrations of the elastic member.

7. A vibration actuator according to claim 1, wherein the relative moving element contacts a driven member, and a pressing force adjustment mechanism presses the vibration actuator toward the relative moving element via the extension member.

8. A vibration actuator according to claim 1, wherein the bending vibrations in the elastic member have plural nodes, and the extension member is disposed between the nodes in a long side direction of the elastic member.

9. A method of providing a vibration actuator that generates vibrations in an elastic member through an electro-mechanical conversion element, comprising the steps of:

generating longitudinal and bending vibrations in the elastic member with the electro-mechanical conversion element such that the vibrations cause relative motion between the elastic member and a relative moving element, wherein a side surface of the elastic member constitutes a neutral surface of the bending vibration; and applying a pressure force by an extension member attached to a side surface of the elastic member directly and which has a thickness that is thinner than the thickness of the elastic member and which is disposed at or near the neutral surface of the bending vibration and extending along a long side direction of the side surface, to press a driving force output portion of the elastic member toward the relative moving element.

10. A method of providing a vibration actuator according to the steps of claim 9, further comprising the step of positioning the extension member symmetrically with respect to a long side direction of the elastic member.

11. A method of providing a vibration actuator according to the steps of claim 9, wherein the driving force output portion includes two driving force output portions, further comprising the step of positioning the extension member between the two driving force output portions.

12. A method of providing a vibration actuator according to the steps of claim 9, further comprising the step of providing a pressing unit at an edge of the extension member such that the pressing unit extends in a vibration direction of the bending vibrations.

13. A method of providing a vibration actuator according to the steps of claim 9, further comprising the step of pressing the vibration actuator toward the relative moving element by a pressing force adjustment mechanism via the extension member.

14. A method of providing a vibration actuator according to the steps of claim 9, wherein the bending vibrations in the elastic member have plural nodes, and further comprising the step of providing the extension member between the nodes in long side direction of the elastic member.

* * * * *